US008123479B2

(12) United States Patent
Klemo et al.

(10) Patent No.: US 8,123,479 B2
(45) Date of Patent: Feb. 28, 2012

(54) METHOD TO MINIMIZE OSCILLATION IN CEILING FANS

(75) Inventors: Elios Klemo, Wilmington, NC (US); Richard A. Oleson, Lexington, KY (US)

(73) Assignee: Delta T Corporation, Lexington, KY (US)

( * ) Notice: Subject to any disclaimer, the term of this patent is extended or adjusted under 35 U.S.C. 154(b) by 598 days.

(21) Appl. No.: 12/336,090

(22) Filed: Dec. 16, 2008

(65) Prior Publication Data

US 2009/0162197 A1    Jun. 25, 2009

Related U.S. Application Data

(60) Provisional application No. 61/014,948, filed on Dec. 19, 2007.

(51) Int. Cl.
 *F01D 17/06* (2006.01)
 *B64H 3/10* (2006.01)
 *F03B 15/18* (2006.01)
(52) U.S. Cl. ................ 416/31; 416/25; 415/16
(58) Field of Classification Search .............. 416/1, 5, 416/61, 35, 25, 30, 31; 415/15, 1, 13, 16
See application file for complete search history.

(56) References Cited

U.S. PATENT DOCUMENTS

| | | | |
|---|---|---|---|
| 5,189,412 A | 2/1993 | Mehta et al. | |
| 6,244,821 B1 | 6/2001 | Boyd et al. | |
| 6,710,505 B1 | 3/2004 | Barani et al. | |
| 6,883,754 B2 | 4/2005 | Ehrick | |
| 6,939,108 B2 | 9/2005 | Boyd | |
| 7,142,990 B2 | 11/2006 | Bouse et al. | |
| 7,252,478 B2 | 8/2007 | Aynsley | |
| 7,284,960 B2 | 10/2007 | Aynsley | |
| 7,400,055 B2 | 7/2008 | Nagao | |
| D587,799 S | 3/2009 | Oleson | |
| 7,661,316 B2 * | 2/2010 | Gross et al. ............. | 73/660 |
| 2005/0253731 A1 | 11/2005 | Fitzgibbon et al. | |
| 2008/0008596 A1 | 1/2008 | Aynsley | |
| 2008/0014090 A1 | 1/2008 | Aynsley et al. | |
| 2008/0213097 A1 | 9/2008 | Oleson et al. | |

FOREIGN PATENT DOCUMENTS

EP    1719910    11/2006

OTHER PUBLICATIONS

U.S. Appl. No. 12/203,960, filed Sep. 4, 2008, Oleson.

(Continued)

*Primary Examiner* — A. Sefer
*Assistant Examiner* — Nikolay Yushin
(74) *Attorney, Agent, or Firm* — Frost Brown Todd LLC

(57) ABSTRACT

A fan system includes a fan and a fan rotation speed control. The speed control is operable to command the fan to rotate at a speed selected from a certain range of rotation speeds. A fan oscillation detector may be coupled with the fan to detect oscillation of the fan as the speed control is operated to rotate the fan at various speeds among the range of fan rotation speeds. The fan oscillation detector may comprise an accelerometer or other device. Oscillation amounts detected by the oscillation detector are compared against each other or against an oscillation threshold value. A programmer device identifies fan rotation speeds at which the oscillation amount exceeds the threshold or is otherwise unacceptable, and programs the fan rotation speed control to prevent an operator from being able to select those speeds at which the oscillation amount exceeds the threshold or is otherwise unacceptable.

13 Claims, 2 Drawing Sheets

OTHER PUBLICATIONS

U.S. Appl. No. 12/233,783, filed Sep. 19, 2008, Scherer et al.
U.S. Appl. No. 12/249,086, filed Oct. 10, 2008, Aynsley et al.
U.S. Appl. No. 61/034,254, filed Mar. 6, 2008, Smith et al.
International Search Report and Written Opinion of the International Searching Authority dated Feb. 24, 2009 for Application No. PCT/US2008/087377.

U.S. Appl. No. 12/399,428, filed Mar. 6, 2009, Smith et al.
U.S. Appl. No. 60/978,860, filed Oct. 10, 2007, Aynsley et al.
U.S. Appl. No. 61/014,948, filed Dec. 19, 2007, Klemo et al.
U.S. Appl. No. 61/025,852, filed Feb. 4, 2008, Toy.
U.S. Appl. No. 61/109,220, filed Oct. 29, 2008, Smith et al.

* cited by examiner

METHOD TO MINIMIZE OSCILLATION IN CEILING FANS

PRIORITY

This application claims priority from the disclosure of U.S. Provisional Patent Application Ser. No. 61/014,948, entitled "Automatic Control System to Minimize Oscillation In Ceiling Fans," filed Dec. 19, 2007, the disclosure of which is incorporated by reference herein in its entirety.

BACKGROUND

A variety of fan systems have been made and used over the years in a variety of contexts. For instance, various ceiling fans are disclosed in U.S. Pat. No. 7,284,960, entitled "Fan Blades," issued Oct. 23, 2007, the disclosure of which is incorporated by reference herein; U.S. Pat. No. 6,244,821, entitled "Low Speed Cooling Fan," issued Jun. 12, 2001, the disclosure of which is incorporated by reference herein; U.S. Pat. No. 6,939,108, entitled "Cooling Fan with Reinforced Blade," issued Sep. 6, 2005, the disclosure of which is incorporated by reference herein; U.S. Pub. No. 2008/0008596, entitled "Fan Blades," published Jan. 10, 2008, the disclosure of which is incorporated by reference herein; and U.S. Provisional Patent Application Ser. No. 61/034,254, entitled "Ceiling Fan System with Brushless Motor," filed Mar. 6, 2008, the disclosure of which is incorporated by reference herein. Alternatively, any other suitable fans may be used in conjunction with embodiments described herein.

The outer tip of a fan blade or airfoil may be finished by the addition of an aerodynamic tip or winglet. Merely exemplary winglets are described in U.S. Pat. No. 7,252,478, entitled "Fan Blade Modifications," issued Aug. 7, 2007, the disclosure of which is incorporated by reference herein; U.S. Pub. No. 2008/0014090, entitled "Cuffed Fan Blade Modifications," published Jan. 17, 2008, the disclosure of which is incorporated by reference herein; and U.S. Pub. No. 2008/0213097, entitled "Angled Airfoil Extension for Fan Blade," published Sep. 4, 2008, the disclosure of which is incorporated by reference herein. Other suitable structures that may be associated with an outer tip of an airfoil or fan blade will be apparent to those of ordinary skill in the art in view of the teachings herein. Alternatively, the outer tip of an airfoil or fan blade may be simply closed, or may lack any similar structure at all.

The interface of a fan blade and a fan hub may also be provided in a variety of ways. For instance, an interface component is described in U.S. Non-Provisional patent application Ser. No. 12/233,783, entitled "Aerodynamic Interface Component for Fan Blade," filed Sep. 19, 2008, the disclosure of which is incorporated by reference herein. Alternatively, the interface of a fan blade and a fan hub may include any other component or components, or may lack any similar structure at all.

Fans may also include a variety of mounting structures. For instance, a fan mounting structure is disclosed in U.S. Non-Provisional patent application Ser. No. 12/203,960, entitled "Ceiling Fan with Angled Mounting," filed Sep. 4, 2008, the disclosure of which is incorporated by reference herein. In addition, a fan may include sensors or other features that are used to control, at least in part, operation of a fan system. For instance, such fan systems are disclosed in U.S. Non-Provisional patent application Ser. No. 12/249,086, entitled "Ceiling Fan with Concentric Stationary Tube and Power-Down Features," filed Oct. 10, 2008, the disclosure of which is incorporated by reference herein; and U.S. Provisional Patent Application Ser. No. 61/025,852, entitled "Automatic Control System for Ceiling Fan Based on Temperature Differentials," filed Feb. 4, 2008, the disclosure of which is incorporated by reference herein. Alternatively, any other suitable mounting structures and/or fan systems may be used in conjunction with embodiments described herein.

In some installations, a ceiling fan is suspended from a ceiling structure by means of a vertical post or tube of some specified finite length. As the fan rotates at the bottom of this post or tube, any small imbalance of the rotating mass may result in a lateral force against the bottom end of the post or tube, which may tend to move the fan sideways. Because the mass is rotating, the direction of the resultant lateral force may also rotate at the same speed as the rotation of the fan, such that the fan may move in an orbital motion or rock in addition to rotating.

When a mass is suspended from a support by a vertical suspension member such as the post or tube described above, the assembly may have a natural resonant frequency at which any oscillation may be exaggerated. This frequency may vary based on a number of factors, including but not limited to the length of the supporting post or tube, the mass of the fan, and/or the mass of the post or tube. Because the length of the post or tube may not be determined until the time of installation, it may not be possible for the manufacturer of the product to predict the fan speed at which this resonance will occur in some scenarios. When the fan is rotating at the speed that matches the resonant frequency of the system, the lateral forces caused by the rotating mass may result in lateral and/or orbital oscillation of the fan.

In some settings, it may be desirable to minimize the oscillation of a fan in operation. One way of minimizing this oscillation may be to prevent the fan from rotating at the speed that corresponds to a resonant frequency of the assembly. Of course, preventing a fan from rotating at one or more certain speeds may yield other results, in addition to or in lieu of minimizing oscillation. To manually prevent a fan from rotating at one or more certain speeds may require the operator to observe the operation of the fan and avoid those settings at which it appears to oscillate.

It may also be possible, such as if the fan motor is controlled by a Variable Frequency Drive or other electronic speed control device, to program the control device so that it excludes certain frequencies from the speed control spectrum. Once this is done, as the manual control is adjusted, the control device may automatically select a slightly faster or slower speed, skipping past a speed that tends to cause the fan to oscillate. Performing this initial programming, however, may be time-consuming and may be beyond the capacity of some installers. It may also depend on visual observation to determine which speed or speeds should be excluded from the control spectrum to ensure best operation. Such observation may be imperfect and result in an incorrect programming of the control device.

While a variety of systems and techniques have been made and used to control fans and fan systems, it is believed that no one prior to the inventors has made or used the invention recited in the appended claims.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Reference will now be made in detail to various embodiments of the invention, examples of which are illustrated in the accompanying drawings. To the extent that specific dimensions are shown in the accompanying drawings, such dimensions should be regarded as merely illustrative and not limiting in any way. Accordingly, it will be appreciated that such dimensions may be varied in any suitable way.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

Figure 1:
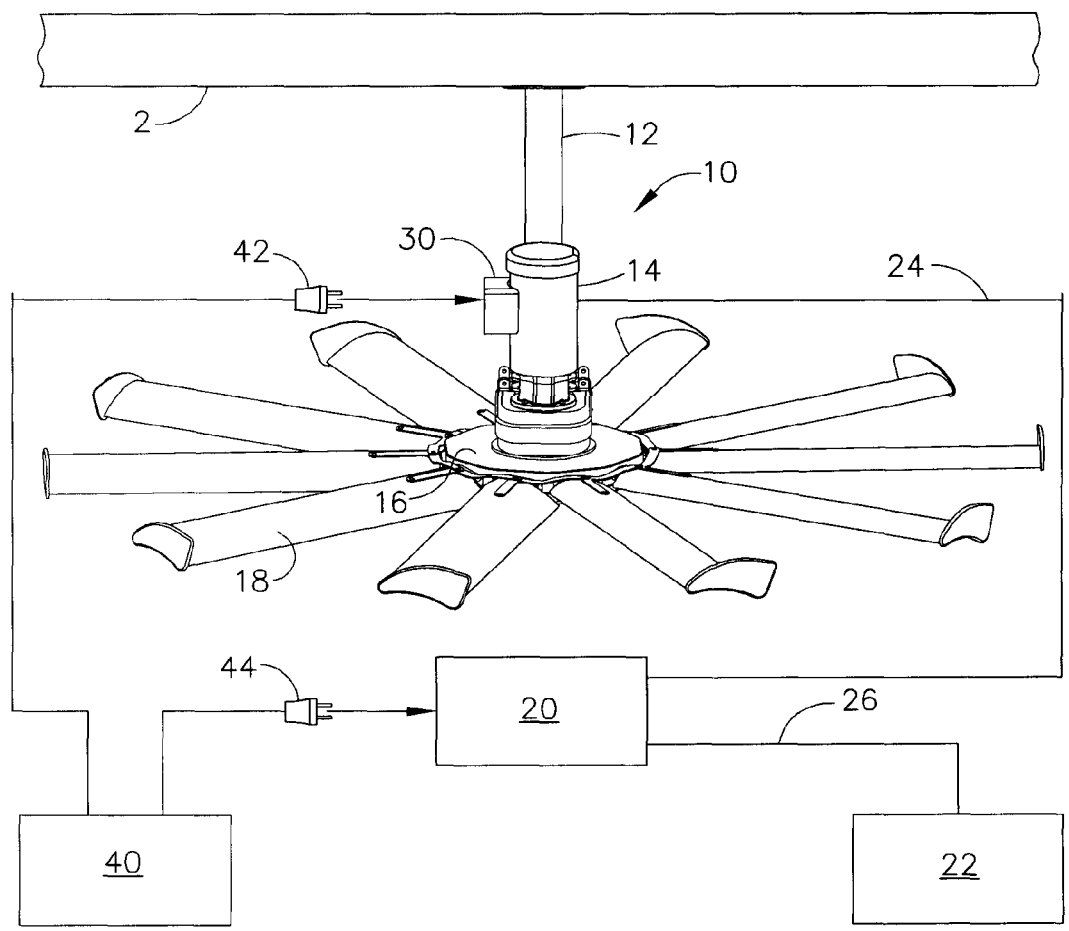
FIG. 1 depicts a schematic view of an exemplary fan system including control components.
Figure 1:
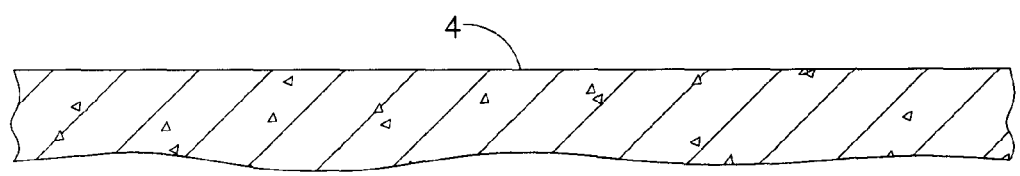

As shown in FIG. 1, an exemplary fan (10) is coupled with a ceiling structure (2), and is suspended over a floor (4). Fan (10) includes a support (12), which is directly coupled with ceiling structure (2). Support (12) may be constructed and/or operable in accordance with the teachings of any of the patents, patent publications, or patent applications cited herein. Fan (10) also includes a motor (14), a hub (16) that is rotated by motor (14), and a plurality of fan blades (18) extending radially outwardly from hub (16). Again, any of these components, among other components that fan (10) may have as desired, may be constructed and/or operable in accordance with the teachings of any of the patents, patent publications, or patent applications cited herein.

A speed control device (20) is in communication with motor (14). For instance, speed control device (20) may include a programmable variable speed control, providing a spectrum of speeds at which hub (16) may be rotated by motor (14). Suitable components and features of speed control device (20) will be apparent to those of ordinary skill in the art in view of the teachings herein. Speed control device (20) may communicate with motor (14) via wire (24), wirelessly, or in any other suitable fashion. A user interface (22) may also be in communication with speed control device (20), permitting an operator to adjust speed settings (e.g., select from discrete pre-defined speeds or select a speed from a substantially continuous range of speeds, etc.) for motor (14) through speed control device (20). By way of example only, user interface (22) may comprise a wall-mounted control panel that is configured and operable in accordance with the teachings of U.S. Provisional Patent Application Ser. No. 61/034, 254, entitled "Ceiling Fan System with Brushless Motor," filed Mar. 6, 2008, the disclosure of which is incorporated by reference herein. Alternatively, any other suitable user interface (22) may be used. In the present example, user interface (22) communicates with speed control device (20) via wire (26). However, it should be understood that user interface (22) may alternatively communicate with speed control device (20) wirelessly or in any other suitable fashion.

It should also be understood that speed control device (20) and user interface (22) may be provided in any suitable location. By way of example only, speed control device (20) may be located within or adjacent to motor (14). Alternatively, speed control device (20) may be located within or adjacent to user interface (20), or somewhere else between user interface (22) and motor (14). Alternatively, speed control device (20) may be provided at any other suitable location. Similarly, user interface (22) may be mounted to a wall, may be provided by a computer that is far remote from the location in which fan (10) is installed, or may be provided at any other suitable location.

As also shown in FIG. 1, an accelerometer (30) is attached to fan (10). By way of example only, accelerometer (30) may be attached to the housing of motor (14). Alternatively, accelerometer (30) may be attached to any other suitable component of fan (10) (e.g., a gearbox (not shown), support (12), etc.) in any suitable location. Accelerometer (30) may comprise any suitable conventional accelerometer (30) and may be configured to detect lateral or orbital oscillation or wobbling of fan (10) (e.g., about the axis about which hub rotates (16), etc.), or similar movement of fan.

An installer interface (40) may be coupled with accelerometer (30) via a connector (42), and is configured to receive data signals communicated from accelerometer (30). By way of example only, connector (42) may be wired to installer interface (40). Alternatively, installer interface (40) may communicate with accelerometer (30) wirelessly or in any other suitable fashion. Installer interface (40) may also be coupled with speed control device (20) via a connector (44), and is configured to transmit data or commands to speed control device (20). By way of example only, connector (44) may be wired to installer interface (40). Alternatively, installer interface (40) may communicate with speed control device (20) wirelessly or in any other suitable fashion.

Installer interface (40) of the present example is operable by an installer to set up and program speed control device (20). In particular, and as will be described in greater detail below, installer interface (40) may receive data from accelerometer (30) indicating various levels of oscillation of fan (10) at various speeds of fan (10); and may be used to program speed control device (20) to exclude selectability of one or more speeds where the greatest degree of oscillation of fan (10) occurs. In addition or in the alternative, installer interface (40) may program speed control device (20) to exclude selectability of one or more speeds where the oscillation of fan (10) exceeds a threshold value. With speed control device (20) thus programmed, fan (10) may run substantially smoothly and substantially free of substantial oscillation at all selectable speeds throughout its range. A software program may reside on and be executed by installer interface (40) to analyze data gathered from accelerometer (30) and program speed control device (20).

Installer interface (40) may be used to set up and program speed control device (20) as part of the installation of fan (10). In other versions, a previously installed and used fan (10) is retrofitted with accelerometer (30), and installer interface (40) is used to program speed control device (20) some appreciable time after fan (10) has been installed and used. Alternatively, installer interface (40) may be used to set up and program speed control device (20) at any other suitable time.

It will be appreciated by those of ordinary skill in the art in view of the teachings herein that installer interface (40) may comprise a variety of types of devices. By way of example only, installer interface (40) may comprise a portable computer (e.g., laptop PC, etc.) or handheld device. Alternatively, installer interface (40) may comprise remote but networked desktop PC, a custom device created to program speed control device (20), etc., or any other suitable device. In some other versions, installer interface (40) is integrated into speed control device (20). In other words, speed control device (20) may already have features included for processing data from accelerometer (30) and automatically determining which rotational speeds should be excluded from a range, etc., as described herein.

Figure 2:
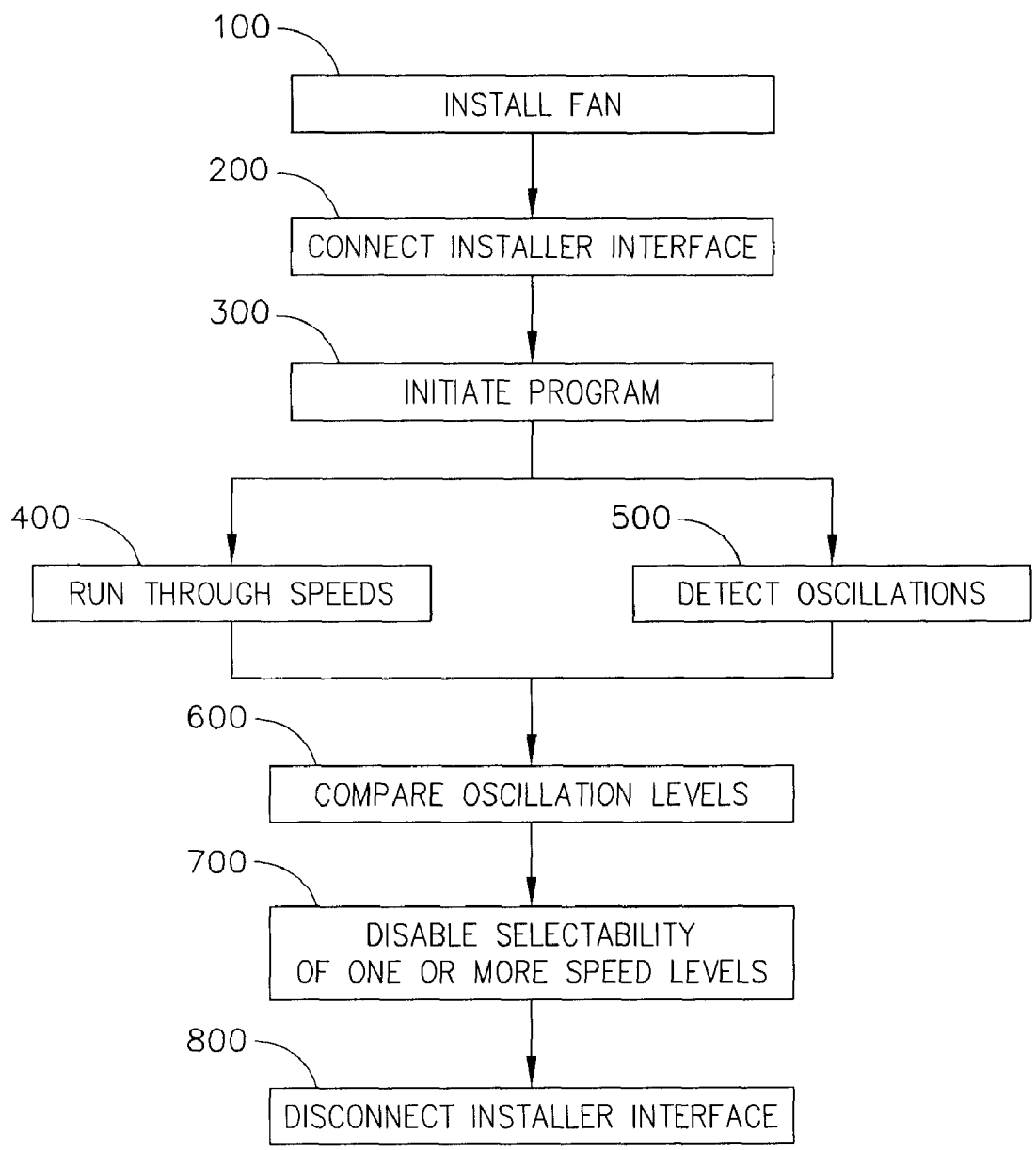
FIG. 2 depicts a flow diagram showing exemplary steps that may be carried out at installation of the fan system of FIG. 1.

FIG. 2 depicts exemplary steps of a process that may be carried out using the components described herein. As shown in block (100), an installer first installs fan (10) and speed control device (20) and makes associated electrical connections. At this stage, fan (10) may be fully operable, and speed control device (20) may provide a full degree of speed selection throughout any suitable range. Then, as shown in block (200), the installer couples installer interface (40) with accelerometer (42) and with speed control device (20). As shown in block (300), the installer then initiates a software program on installer interface (40). Alternatively, the software program may be automatically initiated as soon as a connection between installer interface (40) and accelerometer (30) and a connection between installer interface and speed control device (20) are established.

After the above-noted connections have been established and the software on installer interface (40) has been initiated in the present example, installer interface (40) sends commands to speed control device (20), operating fan (10) in sequence at all available speeds, as shown in block (400). To the extent that speed control device (20) presents a continuous spectrum of speed levels (e.g., as opposed to a pre-set, finite number of speed levels), installer interface (40) may select any suitable number of speed levels from within that spectrum. It should also be understood that speed selection may be performed automatically (e.g., in response to the software being initiated, in response to installer interface (40) being coupled with speed control device (20), etc.), in response to a user's manual selection of speed increments through either installer interface (40) or speed control device (20), or in any other suitable fashion.

As fan (10) operates through the range of speeds as described above, accelerometer (30) detects acceleration (e.g., movement of fan (10) in a direction that is lateral to and/or orbital about the axis that fan (10) rotates about, etc.) and sends data indicative of such acceleration to installer interface (40), as shown in block (500). Of course, oscillation or other movement may be measured using a variety of alternative devices and techniques as described in greater detail below, any of which may be used. Installer interface (40) simultaneously tracks fan (10) rotation speed data associated with speed control device (20) and acceleration data from accelerometer (30), and maintains a record of such data, maintaining an affiliation (or at least recording the data in such a way to permit later affiliation) between each fan (10) rotation speed level and corresponding acceleration data from accelerometer (30).

After speed control device (20) has run through the range of available rotation speeds, installer interface (40) compares acceleration or oscillation readings recorded at each fan (10) rotation speed; and identifies one or more speeds that are associated with the highest accelerations or oscillations, as shown in block (600). For instance, installer interface (40) may flag any speeds at which the oscillation amount is at least a certain percentage greater than the average of all detected oscillation amounts. Suitable acceleration or oscillation levels or disparities for flagging during this part of the process will be apparent to those of ordinary skill in the art in view of the teachings herein. In other versions, rather than comparing detected oscillation amounts among each other, installer interface (40) compares detected oscillation amounts to a predefined oscillation threshold. Suitable oscillation threshold values will be apparent to those of ordinary skill in the art in view of the teachings herein. In still other versions, installer interface (40) flags the speed at which the oscillation amount is the highest (i.e., higher than all of the other detected oscillation amounts). In such versions, the second-highest oscillation amount may be viewed as establishing an oscillation threshold. An oscillation threshold value therefore need not necessarily be determined before the process is initiated, though a predetermined threshold value may certainly be used if desired. Alternatively, the top two highest oscillation amounts, top three highest oscillation amounts, etc., may have their associated speeds flagged by installer interface (40). Other ways in which one or more unacceptable or otherwise undesired amounts of oscillation may be established will be apparent to those of ordinary skill in the art in view of the teachings herein.

After determining which speed levels result in unacceptable or otherwise undesired degrees of wobbling or oscillation, installer interface (40) of the present example then sends a command to speed control device (20), directing speed control device (20) to exclude the one or more speeds from the set of speeds that will be available for selection through user interface (22), as shown in block (700). Such information may be stored within any suitable storage device associated with speed control device (20) (e.g., a chip, flash memory, etc. that is integral with speed control device (20), a storage device that is remote from but in communication with speed control device (20), etc.). It should be understood that, in some settings, only one speed may be associated with an unacceptable or undesirable of oscillation or wobbling; or that any number of speeds may be associated with an unacceptable or undesirable of oscillation or wobbling.

After speed control device (20) has been programmed as described above, the installer may then disconnect installer interface (40) from speed control device (20) and accelerometer (30), as shown in block (800). Fan (10), speed control device (20), and user interface (22) may then be ready for normal use. It will be understood that, during such use, an operator may select various speeds through user interface (22), yet speed control device (20) may prevent the operator from being able to select those speeds that installer interface (40) determined were associated with unacceptable or undesirable degrees of oscillation or wobbling. In particular, speed control device (20) may "step up" or "step down," skipping past a speed setting that was excluded by installer interface (40), to the nearest available setting, as an operator adjusts the speed of fan (10) through user interface (22).

It will be appreciated in view of the teachings herein that the above steps are merely exemplary. Indeed, each and every one of the above-listed steps may be modified, substituted, supplemented, rearranged, and/or omitted as desired. By way of example only, steps described above as being performed by or using installer interface (40) may alternatively be performed by or using speed control device (20) instead (e.g., where accelerometer (30) is directly coupled with speed control device (20) and where speed control device (20) has suitable logging and comparison software, etc.). Other suitable variations will be apparent to those of ordinary skill in the art in view of the teachings herein.

It should also be understood that an accelerometer (30) need not necessarily be used, as any other suitable type of sensor or device may suffice. Alternatively, acceleration may be measured using a variety of other techniques. Furthermore, a first software program may be used to perform the initial analysis of data associated with wobbling or oscillation of fan (10); with a second software program being used to program speed control device (20). Some exemplary alternative components will be described in greater detail below, while other ways in which components may be changed, rearranged, etc., will be apparent to those of ordinary skill in the art in view of the teachings herein.

By way of example only, in some other variations, an accelerometer (30) is omitted altogether. For instance, strain sensors may be used to measure strain along any point of certain components. By way of example only, sensors may be used to measure lateral strain at an interface between fan (10) and support (12), at an interface between a support (12) and the ceiling (2), and/or elsewhere. Such strain levels may be treated similarly to acceleration as noted above (e.g., speed levels at which strain exceeds a certain threshold are flagged, and such flagged speeds are excluded from selection during subsequent operation of fan (10)).

In still other variations, one or more proximity sensors, cameras, machine vision sensors, or other optical devices are used to detect wobbling of fan (10) or of certain components of fan (10). Such "viewed" wobbling may be automatically converted into data that may be treated similar to acceleration as noted above (e.g., speed levels at which wobbling exceeds a certain threshold are flagged, and such flagged speeds are excluded from selection during subsequent operation of fan (10)). Such sensors may be positioned on the floor (4), on the ceiling (2), on a wall, on a component of fan (10), and/or elsewhere. Other suitable technologies that may be used to detect wobbling or oscillation may include ultrasound, radio, radar, gyroscopic devices, GPS systems, or other technologies. Still other suitable devices, technologies, and methods that may be used to detect oscillation or wobbling of fan (10) will be apparent to those of ordinary skill in the art in view of the teachings herein.

It will also be appreciated in view of the teachings herein that a speed control device (20) need not necessarily be programmed at the site at which a fan (10) will be ultimately installed and used. For instance, a formula, chart, spreadsheet, or other form or arrangement of data may be developed and used to determine which speed levels will cause undesirable oscillation or wobbling of fan (10), as a function of certain factors such as weight of fan (10), weight of support (12), length of support (12), etc. Such speed levels may be rendered unavailable for selection through speed control device (20) before or after speed control device (20) is installed. Such a formula or chart, etc. may be referred to manually or electronically/automatically to pre-program a speed control device (20) in a custom fashion, based on suitable factors associated with a given installation, before fan (10) is even installed. Such a formula or chart, etc. may be developed using techniques described herein and/or using other techniques.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A method of configuring a fan system, the method comprising:
    (a) providing a fan, wherein the fan is operable to rotate about an axis;
    (b) providing a fan control, wherein the fan control is operable to control rotation of the fan, wherein the fan control is operable to select a fan rotation speed from an available range of fan rotation speeds and cause the fan to rotate at a selected speed;
    (c) operating the fan at a plurality of different speeds;
    (d) monitoring oscillation of the fan relative to the axis of the fan, wherein the act of monitoring comprises detecting a displacement of the fan while the fan is operating at the different speeds; and
    (e) programming the fan control to prevent selectability of one or more fan rotation speeds from the range of fan rotation speeds in response to the act of monitoring.

2. The method of claim 1, wherein the fan has an attached accelerometer, wherein the act of monitoring oscillation of the fan comprises receiving data from the accelerometer.

3. The method of claim 2, wherein the accelerometer is in communication with the fan control.

4. The method of claim 1, further comprising providing an installer interface device in communication with the fan control, wherein the act of monitoring oscillation of the fan is performed at least in part by the installer interface device.

5. The method of claim 4, wherein the fan has an attached accelerometer, wherein the accelerometer is in communication with the installer interface device.

6. The method of claim 4, wherein the installer interface device comprises a computer programmed to perform the act of monitoring oscillation of the fan, wherein the computer is further programmed to perform the act of programming the fan control.

7. The method of claim 1, further comprising correlating monitored oscillation amounts with associated fan rotation speeds from the plurality of different speeds.

8. The method of claim 7, further comprising comparing monitored oscillation amounts to a certain oscillation value.

9. The method of claim 8, wherein the certain oscillation value comprises a predetermined oscillation threshold.

10. The method of claim 8, further comprising determining which speeds of the plurality of different speeds correspond with oscillation amounts exceeding the certain oscillation value.

11. The method of claim 10, wherein the act of disabling selectability of one or more fan rotation speeds comprises disabling selectability of speeds corresponding with oscillation amounts exceeding the certain oscillation value.

12. A method of programming a fan speed control device, wherein the fan speed control device is operable to select a plurality of fan rotation speeds from among a range of fan rotation speeds and cause a fan to rotate at a selected speed, the method comprising:
    (a) tracking fan oscillation amounts as the fan is rotated through the range of rotation speeds, wherein the fan oscillation amounts comprise a plurality of displacement values of the fan relative to a predetermined position;
    (b) comparing the tracked fan oscillation amounts to an oscillation threshold;
    (c) determining which one or more fan rotation speeds are associated with tracked fan oscillation amounts exceeding the oscillation threshold; and
    (d) programming the speed control to prevent selectability of the one or more fan rotations speeds that are associated with oscillation amounts exceeding the oscillation threshold.

13. The method of claim 12, further comprising tracking fan rotation speeds, wherein the act of tracking fan rotation speeds is performed substantially simultaneously with the act of tracking fan oscillation amounts.

* * * * *